United States Patent
Shibata et al.

(10) Patent No.: US 10,023,934 B2
(45) Date of Patent: Jul. 17, 2018

(54) HIGH-STRENGTH HOT-DIP GALVANNEALED STEEL SHEET HAVING EXCELLENT BAKE HARDENING PROPERTY AND BENDABILITY

(71) Applicant: KOBE STEEL, LTD., Kobe-shi (JP)

(72) Inventors: Kosuke Shibata, Hyogo (JP); Toshio Murakami, Hyogo (JP); Muneaki Ikeda, Hyogo (JP); Michiharu Nakaya, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/120,695

(22) PCT Filed: Mar. 4, 2015

(86) PCT No.: PCT/JP2015/056431
§ 371 (c)(1),
(2) Date: Aug. 22, 2016

(87) PCT Pub. No.: WO2015/133550
PCT Pub. Date: Sep. 11, 2015

(65) Prior Publication Data
US 2017/0009315 A1    Jan. 12, 2017

(30) Foreign Application Priority Data
Mar. 6, 2014    (JP) .................. 2014-043818

(51) Int. Cl.
*B32B 15/00* (2006.01)
*C21D 9/46* (2006.01)
(Continued)

(52) U.S. Cl.
CPC .............. *C21D 9/46* (2013.01); *B32B 15/013* (2013.01); *C22C 38/001* (2013.01);
(Continued)

(58) Field of Classification Search
CPC ............ B32B 15/013; C21D 2211/002; C21D 2211/005; C21D 2211/008; C21D 9/46;
(Continued)

(56) References Cited

U.S. PATENT DOCUMENTS

| 2013/0008570 A1 | 1/2013 | Ikeda et al. |
| 2013/0040165 A1 | 2/2013 | Shiraki et al. |
| 2015/0111064 A1 | 4/2015 | Ikeda et al. |

FOREIGN PATENT DOCUMENTS

| EP | 2 995 698 A1 | 3/2016 |
| JP | 2007-177271 A | 7/2007 |

(Continued)

OTHER PUBLICATIONS

Machine Translation of JP 2007-177271(from IDS), translated:Sep. 12, 2017.*

(Continued)

*Primary Examiner* — David Sample
*Assistant Examiner* — Elizabeth Collister
(74) *Attorney, Agent, or Firm* — Oblon, McClelland, Maier & Neustadt, L.L.P.

(57) ABSTRACT

The present disclosure relates to a high-strength hot-dip galvannealed steel sheet excellent in bake hardenability and bendability and having a component composition containing, in mass %, C: from 0.05 to 0.30%, Si: from 0.5 to 3.0%, Mn: from 0.2 to 3.0%, P: from 0 to 0.10%, S: from 0 to 0.010%, N: form 0 to 0.010%, and Al: from 0.001 to 0.10%, with the remainder being iron and unavoidable impurities. The steel sheet has a steel structure containing, in terms of area percentage, martensite: form 50 to 85% and ferrite: 0% or more and less than 5%, with the remainder being bainite. The steel sheet has a dislocation density of $5.0 \times 10^{15}$ m$^{-2}$ or more, a solute carbon amount of 0.08 mass % or more and a tensile strength of 1180 MPa or more.

12 Claims, 1 Drawing Sheet

(51) Int. Cl.
*C23C 2/06* (2006.01)
*C23C 2/28* (2006.01)
*C22C 38/06* (2006.01)
*B32B 15/01* (2006.01)
*C22C 38/00* (2006.01)
*C22C 38/02* (2006.01)
*C22C 38/04* (2006.01)
*C22C 38/08* (2006.01)
*C22C 38/12* (2006.01)
*C22C 38/14* (2006.01)
*C22C 38/16* (2006.01)
*C22C 38/22* (2006.01)
*C22C 38/28* (2006.01)
*C22C 38/32* (2006.01)
*C22C 38/38* (2006.01)
*C23C 2/40* (2006.01)

(52) U.S. Cl.
CPC ............ *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/28* (2013.01); *C22C 38/32* (2013.01); *C22C 38/38* (2013.01); *C23C 2/06* (2013.01); *C23C 2/28* (2013.01); *C23C 2/285* (2013.01); *C23C 2/40* (2013.01); *C21D 2211/002* (2013.01); *C21D 2211/005* (2013.01); *C21D 2211/008* (2013.01)

(58) Field of Classification Search
CPC ..... C22C 38/001; C22C 38/002; C22C 38/02; C22C 38/04; C22C 38/06; C22C 38/08; C22C 38/12; C22C 38/14; C22C 38/16; C22C 38/22; C22C 38/28; C22C 38/32; C22C 38/38; C22C 38/58; C23C 2/06; C23C 2/28; C23C 2/285; C23C 2/40
See application file for complete search history.

(56) References Cited

FOREIGN PATENT DOCUMENTS

| | | |
|---|---|---|
| JP | 2008-144233 A | 6/2008 |
| JP | 2009-249733 A | 10/2009 |
| JP | 2010-37652 A | 2/2010 |
| JP | 2010-215958 A | 9/2010 |
| JP | 2013-36112 A | 2/2013 |
| WO | WO 2011/122487 A1 | 10/2011 |
| WO | WO 2013/146606 A1 | 10/2013 |
| WO | WO 2014/181728 A1 | 11/2014 |

OTHER PUBLICATIONS

International Search Report dated Apr. 28, 2015 in PCT/JP2015/056431 (with English language translation).
Written Opinion dated Apr. 28, 2015 in PCT/JP2015/056431.
International Preliminary Report on Patentability and Written Opinion dated Sep. 15, 2016 in PCT/JP2015/056431 (submitting English translation only).

* cited by examiner

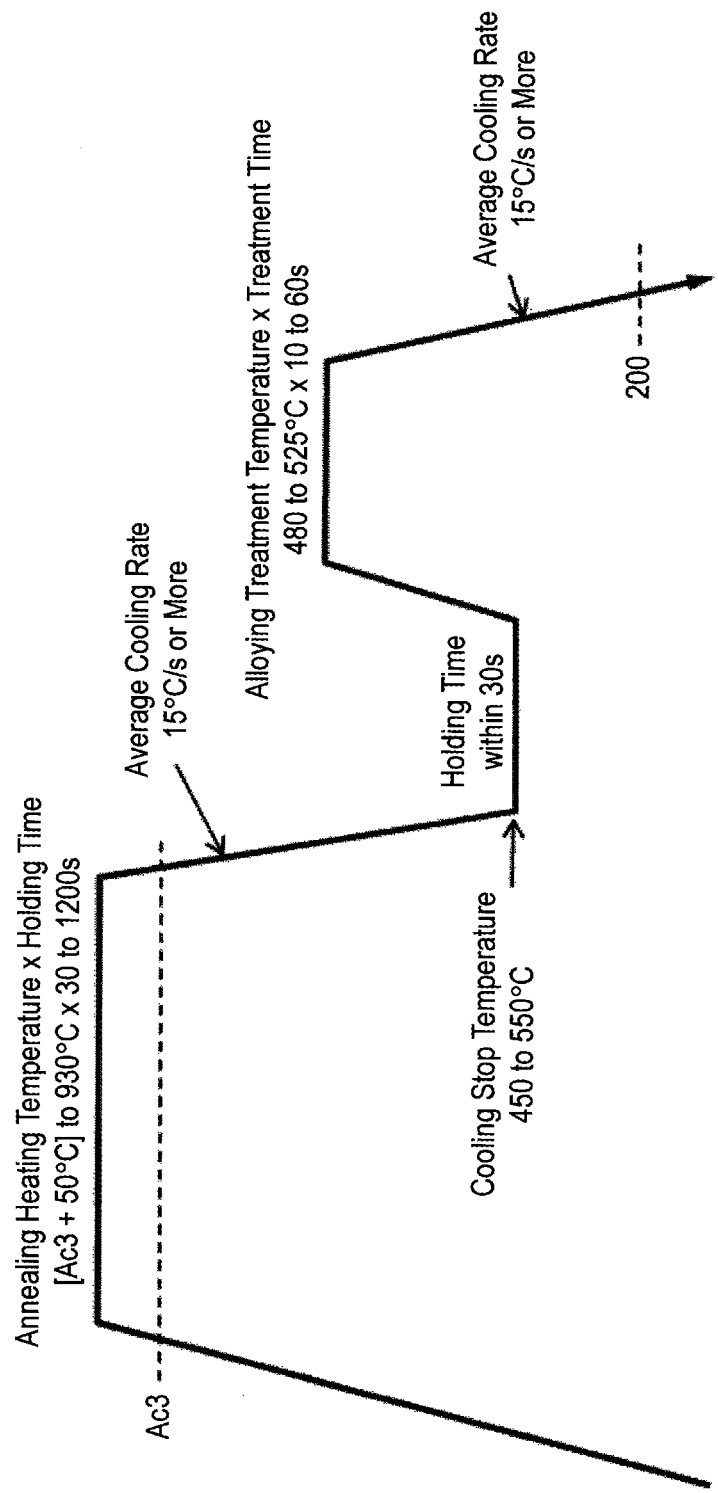

HIGH-STRENGTH HOT-DIP GALVANNEALED STEEL SHEET HAVING EXCELLENT BAKE HARDENING PROPERTY AND BENDABILITY

TECHNICAL FIELD

The present invention relates to a high-strength hot-dip galvannealed steel sheet having excellent bake hardenability (hereinafter also referred to as "BH (Bake Hardening) responses") and bendability, and particularly relates to a hot-dip galvannealed steel sheet (hereinafter also referred to as a "GA steel sheet") having good strength-bake hardenability-bendability balance.

Although the high-strength hot-dip galvannealed steel sheets of the present invention are effectively widely utilized in industrial fields such as automobiles, electrical machinery and machines, descriptions will be hereinafter made focusing on a case in which they are used in automobile bodies, as a typical use example.

BACKGROUND ART

In recent years, for the purpose of achieving both of collision safety and reduction in fuel consumption by vehicle weight saving, GA steel sheets used for automobile steel sheets have been required to have a high strength of 1180 MPa or more and have also been required to have excellent formability (particularly bendability) represented by press forming.

However, improvement in strength is liable to cause deterioration of formability (particularly bendability). Accordingly, when used for the automobile steel sheets requiring complicated working, GA steel sheets have been required, which are relatively easily formed during forming and have a large amount of bake hardening in coating and baking after the forming to achieve high strength, as a property.

The bake hardening is a phenomenon that carbon or nitrogen dissolved in steel is fixed to a dislocation during coating by baking to increase yield strength, and it is known that the higher amount of solute carbon or nitrogen and the higher dislocation density cause the increase in bake hardenability (for example, see Patent Document 1). Martensite or bainite which is often used in order to realize the high strength is high in dislocation density compared to ferrite, and is high in the bake hardenability immediately after production, because carbon is supersaturatedly dissolved in solid.

On the other hand, the GA steel sheet is cooled to a temperature range of 100 to 600° C. after annealing at high temperature, and immersed in a galvanizing bath. Usually, before immersion in the galvanizing bath or during immersion in the galvanizing bath, a transformed structure of martensite or bainite is formed from austenite, and a carbide or a nitride is precipitated by a subsequent alloying treatment at about 500° C. to decrease the amount of solute carbon or nitrogen and to decrease the dislocation density by recovery. For this reason, in the GA steel sheet having martensite or bainite as a main phase, it has been difficult to realize the high bake hardenability.

Further, although the high strength can be realized in the steel sheet having martensite or bainite as a main phase, it has been difficult to achieve both of the bake hardenability and bendability. That is, martensite has a large amount of solute carbon and also has the high dislocation density compared to bainite, so that it is superior in the bake hardenability, but poor in ductility and inferior in the bendability. On the other hand, when bainite is excessively contained, the bendability is improved, but there is a problem that the bake hardenability is deteriorated.

For this reason, in the high-strength GA steel sheet having a tensile strength of 1180 MPa or more, a technique for achieving both of the bake hardenability and the bendability has not been established.

For example, Patent Document 1 discloses a GA steel sheet containing ferrite as a main phase and a hard phase (martensite or bainite) finely dispersed therein. In this GA steel sheet, it is considered that C in a hard structure is dispersed in the ferrite by performing additional heat treatment at 300 to 450° C. after annealing of the steel sheet to increase the amount of solute C in ferrite, thereby enhancing the bake hardenability. However, this GA steel sheet has ferrite as the main phase, so that the tensile strength thereof is as low as about 500 to 600 MPa, and a tensile strength of 1180 MPa or more, which is targeted in the present invention, cannot be achieved. In the Examples of the same document, a GA steel sheet of a martensite single phase (steel No. Q-3 in Table 6) is disclosed as a Comparative Example. In this GA steel sheet, the Mn content is as high as 3.2 mass % (steel No. Q in Table 1). From this, it is assumed to be a martensite single phase steel in which austenite is stabilized and which is in a substantially quenched state, to have the high dislocation density and a large amount of solute carbon, and to have the high bake hardenability. However, this GA steel sheet contains no bainite, and it is not considered that the sufficient bendability is obtained.

Furthermore, Patent Document 2 discloses a technique of obtaining a structure composed of martensite and low-temperature produced bainite by heat treatment of completely austenitizing a steel material by heating at the Ac3 point or higher and subsequent cooling to the Ms point or lower, thereby increasing the dislocation density. However, from the Examples of the same document, it is apparent that this is substantially a heat treatment technique for a cold-rolled sheet, and this is a technique which cannot be realized for the GA steel sheet.

In addition, Patent Document 3 discloses a high-strength cold-rolled steel sheet in which high yield strength and high elongation are considered to be realized by adjusting the dislocation density in the whole structure to $1 \times 10^{15}$ to $1 \times 10^{16}$ m$^{-2}$. However, the structure of this steel sheet is composed of martensite and ferrite tempered at a temperature of higher than 400° C. It is therefore not conceivable that a sufficient amount of solute carbon is ensured, and the excellent bake hardenability cannot be developed.

Moreover, Patent Document 4 discloses a high-strength cold-rolled steel sheet in which both of the high strength and the high bendability are considered to be realized by obtaining a low-temperature tempered martensite single phase steel. However, in this steel sheet, tempering of 120 seconds or more at 100° C. or higher is essential. It is therefore not conceivable that sufficient solute carbon is ensured, and the excellent bake hardenability cannot be developed.

PRIOR ART LITERATURES

Patent Documents

Patent Document 1: JP-A-2009-249733
Patent Document 2: JP-A-2008-144233
Patent Document 3: JP-A-2010-37652
Patent Document 4: JP-A-2010-215958

SUMMARY OF THE INVENTION

Problems that the Invention is to Solve

It is therefore an object of the present invention to provide a high-strength hot-dip galvannealed steel sheet having both of excellent bake hardenability and bendability, and having a tensile strength of 1180 MPa or more.

Means for Solving the Problems

A high-strength hot-dip galvannealed steel sheet excellent in bake hardenability and bendability according to a first invention of the present invention has a component composition containing, in mass %,
C: from 0.05 to 0.30%,
Si: from 0.5 to 3.0%,
Mn: from 0.2 to 3.0%,
P: from 0 to 0.10%,
S: from 0 to 0.010%,
N: from 0 to 0.010%, and
Al: from 0.001 to 0.10%, with the remainder being iron and unavoidable impurities,
has a steel structure containing, in terms of area percentage,
martensite: from 50 to 85% and
ferrite: 0% or more and less than 5%, with the remainder being bainite, and
further has
a dislocation density of $5.0 \times 10^{15}$ m$^{-2}$ or more,
a solute carbon amount of 0.08 mass % or more and
a tensile strength of 1180 MPa or more.

In a high-strength hot-dip galvannealed steel sheet excellent in bake hardenability and bendability according to a second invention of the present invention, the component composition further contains, in mass %, one member or two or more members of
Cu: from 0.05 to 1.0%,
Ni: from 0.05 to 1.0% and
B: from 0.0002 to 0.0050%,
in the above first invention.

In a high-strength hot-dip galvannealed steel sheet excellent in bake hardenability and bendability according to a third invention of the present invention, the component composition further contains, in mass %, one member or two or more members of
Mo: from 0.01 to 1.0%,
Cr: from 0.01 to 1.0%,
Nb: from 0.01 to 0.3%,
Ti: from 0.01 to 0.3%, and
V: from 0.01 to 0.3%,
in the above first or second invention.

In a high-strength hot-dip galvannealed steel sheet excellent in bake hardenability and bendability according to a fourth invention of the present invention, the component composition further contains, in mass %, one member or two members of
Ca: from 0.0005 to 0.01% and
Mg: from 0.0005 to 0.01%,
in any invention of the above first to third inventions.

Advantages Effects of the Invention

According to the present invention, it becomes possible to provide a high-strength hot-dip galvannealed steel sheet having high tensile strength, bake hardenability and bendability at the same time by configuring a steel structure as a structure mainly composed of martensite and bainite and increasing the dislocation density and the solute carbon amount.

BRIEF DESCRIPTION OF THE DRAWING

FIG. 1 is a view schematically illustrating a heat treatment pattern recommended for producing the present invention steel sheet.

MODE FOR CARRYING OUT THE INVENTION

The present inventors have made various studies in order to solve the above-described problems. As a result, it has been found that a GA steel sheet having high strength, high bake hardenability and high bendability at the same time can be obtained by configuring a steel structure of the GA steel sheet as a structure mainly composed of martensite and bainite and moreover ensuring a predetermined dislocation density and solute carbon amount, leading to the completion of the present invention.

First, the structure characterizing the high-strength GA steel sheet according to the present invention (hereinafter also referred to as the "present invention steel sheet") will be described below.

[Structure of Present Invention Steel Sheet]

As described above, the present invention steel sheet has the structure mainly composed of martensite and bainite, and particularly, it is characterized in that the dislocation density and the solute carbon amount are controlled in high ranges.

<In terms of Area Percentage, Martensite: from 50 to 85% and Ferrite: 0% or More and Less Than 5%, with the Remainder Being Bainite>

Ferrite is a structure that not only deteriorates the tensile strength, but also cannot realize the high dislocation density and the high solute carbon amount, and deteriorates the bake hardenability. For this reason, ferrite is limited, in terms of area percentage, to less than 5% (preferably 3% or less and more preferably 2% or less). Martensite is a structure that is excellent in the tensile strength and can realize the high dislocation density and the high solute carbon amount, and is indispensable for obtaining the high strength and the excellent bake hardenability. On the other hand, martensite as a single phase is poor in ductility and inferior in bendability. Therefore, by introducing bainite softer than martensite as the remainder, the bendability can be ensured. Bainite is a structure that can realize the high dislocation density and the high solute carbon amount next to martensite, and is characterized by the excellent bendability, compared to martensite. Martensite is necessary to be 50% or more (preferably 55% or more and more preferably 60% or more) in terms of area percentage, in order to realize the high dislocation density and the high solute carbon amount while ensuring a tensile strength of 1180 MPa or more. However, it is 85% or less (preferably 83% or less and more preferably 80% or less) in terms of area percentage, in order to ensure the bendability.

<Dislocation Density: $5.0 \times 10^{15}$ m$^{-2}$ or More>

In order to realize the excellent bake hardenability, further, the dislocation density in the above-described structure is $5.0 \times 10^{15}$ m$^{-2}$ or more (preferably $6.0 \times 10^{15}$ m$^{-2}$ or more and more preferably $7.0 \times 10^{15}$ m$^{-2}$ or more). Such a dislocation density can be ensured by producing the above-described bainite at low temperature and not tempering the above-described martensite and bainite main structure, although the details thereof will be described later.

<Solute Carbon Amount: 0.08 Mass % or More>

In order to realize the excellent bake hardenability, further, the solute carbon in the above-described structure is 0.08 mass % or more (preferably 0.09 mass % or more and more preferably 0.1 mass % or more). Such a solute carbon amount can be obtained by not tempering the above-described martensite and bainite main structure, although the details thereof will be described later.

The component composition constituting the present invention steel sheet will be described below. The units of chemical components are hereinafter all in mass %. In this description, the percentage based on the mass (mass %) is the same as the percentage based on the weight (wt %).

[Component Composition of the Present Invention Steel Sheet]

C: from 0.05 to 0.30%

C is a hardenability improving element, and an element necessary for increasing the strength and suppressing the production of ferrite. In order to effectively exert the effects as described above, C is contained in an amount of 0.05% or more, preferably 0.07% or more and more preferably 0.1% or more. However, when C is excessively contained, weldability is deteriorated. The content thereof is therefore 0.30% or less, preferably 0.25% or less and more preferably 0.20% or less.

Si: from 0.5 to 3.0%

Si is an element necessary for suppressing the production of a carbide and ensuring the solute carbon amount necessary for bake hardening. Further, Si is also useful as a solid-solution enhancing element, and useful for increasing the strength of the steel sheet. In order to effectively exert the effects as described above, Si is contained in an amount of 0.5% or more, preferably 0.7% or more and more preferably 1.0% or more. However, when Si is excessively contained, the weldability is seriously deteriorated. The content thereof is therefore 3.0% or less, preferably 2.5% or less and more preferably 2.0% or less.

Mn: from 0.2 to 3.0%

Mn is a hardenability improving element, and is useful for increasing the strength of the steel sheet and suppressing the production of ferrite. In order to effectively exert such effects, Mn is contained in an amount of 0.2% or more, preferably 0.5% or more and more preferably 1.0% or more. However, when Mn is excessively contained, adverse effects such as promotion of segregation and occurrence of slab cracking are found. The content thereof is therefore 3.0% or less, preferably 2.5% or less and more preferably 2.0% or less.

P: from 0 to 0.10%

P is an element which promotes grain boundary embrittlement due to grain boundary segregation to deteriorate workability. The content thereof is therefore desirably lower, and is 0.10% or less, preferably 0.08% or less and more preferably 0.05% or less.

S: from 0 to 0.010%

S is an element which forms a sulfide inclusion such as MnS and becomes a crack origin to deteriorate the workability. The content thereof is therefore desirably lower, and is 0.010% or less, preferably 0.005% or less and more preferably 0.003% or less.

N: from 0 to 0.010%

N is an element which forms a coarse nitride and deteriorates the bendability. The content thereof is therefore desirably lower, and is 0.010% or less, preferably 0.008% or less and more preferably 0.005% or less.

Al: from 0.001 to 0.10%

Al is an element useful to deoxidation. In order to obtain such an effect, it is contained in an amount of 0.001% or more, preferably 0.01% or more and more preferably 0.03% or more. However, when Al is excessively contained, problems of deterioration of toughness and deterioration of the workability due to an increase of an inclusion such as alumina arise. The content thereof is therefore 0.10% or less, preferably 0.08% or less and more preferably 0.06% or less.

The steel of the present invention basically contains the above-described components, with the remainder being iron and impurities. However, in addition, the following allowable components may be contained as long as the effects of the present invention are not impaired.

One member or two or more members of
Cu: from 0.05 to 1.0%,
Ni: from 0.05 to 1.0% and
B: from 0.0002 to 0.0050%

These elements are useful elements having an effect of enhancing the hardenability to suppress transformation from austenite before an alloying treatment. In order to obtain such an effect, the respective elements are preferably contained in amounts of the above-described respective lower limits or more. The above-described elements may be contained alone or may be used as a combination of two or more thereof. However, even when these elements are excessively contained, the effects are saturated, resulting in economical waste. The respective elements are therefore used in amounts of the above-described respective upper limits or less.

One member or two or more members of
Mo: from 0.01 to 1.0%,
Cr: from 0.01 to 1.0%,
Nb: from 0.01 to 0.3%,
Ti: from 0.01 to 0.3%, and
V: from 0.01 to 0.3%

These elements are elements useful for improving the strength without deteriorating the bendability. In order to obtain such an effect, the respective elements are preferably contained in amounts of the above-described respective lower limits or more. The above-described elements may be contained alone or may be used as a combination of two or more thereof. However, when these elements are excessively contained, coarse carbides are formed to deteriorate the bendability. The respective elements are therefore used in amounts of the above-described respective upper limits or less.

One member or two members of
Ca: from 0.0005 to 0.01% and
Mg: from 0.0005 to 0.01%

These elements are elements useful for refining an inclusion to decrease the number of fracture origins, thereby enhancing the bendability. In order to obtain such an effect, either element is preferably contained in an amount of 0.0005% or more. The above-described elements may be used either alone or as a combination of two thereof. However, when excessively contained, the inclusion is conversely coarsened to deteriorate the bendability. Either element is therefore used in an amount of 0.01% or less.

[Preferred Production Method of the Present Invention Steel Sheet]

In order to produce the present invention steel sheet satisfying the above-described requirements, the steel sheet is preferably produced while completing the following production requirements.

The production of the present invention steel sheet is characterized by heat treatment (including galvanization)

conditions after hot rolling and cold rolling of a slab. Therefore, as for the production method before the hot rolling and the cold rolling, a conventionally known production method may be employed. That is, the steel having the above-described component composition may be smelted, formed to the slab by slab making or continuous casting, and subjected to the hot rolling and further the cold rolling. The heat treatment conditions will be described below with reference to a heat treatment heat pattern schematically illustrated in FIG. 1.

As illustrated in FIG. 1, first, the steel sheet after the cold rolling (cold rolled material) is heated at an annealing heating temperature of [Ac3 point+50° C.] to 930° C., and then held at that annealing heating temperature for 30 to 1200 seconds (annealing holding time). Thereafter, rapid cooling is performed at an average cooling rate of 15° C./s or more from the annealing heating temperature to a cooling stop temperature of 450 to 550° C. Then, the annealed steel sheet (annealed material) is immersed in a hot-dip galvanizing bath within 30 seconds from the time of the stop of rapid cooling (holding time after rapid cooling), and then held at an alloying treatment temperature of 480 to 525° C. for 10 to 60 seconds (alloying treatment time) to perform the alloying treatment. Thereafter, rapid cooling is performed at an average cooling rate of 15° C./s or more to 200° C., thereby obtaining the present invention steel sheet (high-strength hot-dip galvannealed steel sheet according to the present invention).

Heating the steel sheet after the cold rolling (cold rolled material) at an annealing heating temperature of [Ac3 point+50° C.] to 930° C., and then holding it for 30 to 1200 seconds (annealing holding time)

It is an important requirement for producing the present invention steel sheet to decrease the ferrite fraction by configuring the steel sheet as a structure mainly composed of martensite and bainite. In order to decrease the ferrite fraction, it is necessary to produce an austenite single phase structure during annealing. Further, in order to suppress transformation of austenite before the alloying treatment, it is effective to coarsen the austenite grain size to enhance the hardenability. For that purpose, the annealing heating temperature is Ac3 point+50° C. or higher.

The Ac3 point can be determined from chemical components of steel sheet by using the following formula (1) described in Leslie, "The Physical Metallurgy of Steels", page 273, translated by Koda Shigeyasu, Maruzen Co., Ltd., 1985.

$$Ac3(° C.)=910-203\times\sqrt{C}-15.2\times Ni+44.7\times Si-30\times Mn+700\times P+400\times Al-11\times Cr-20\times Cu+31.5\times Mo+400\times Ti+104\times V \quad (1)$$

Here, the element symbol in the above-described formula indicates the content (mass %) of each element.

Further, when the annealing heating temperature exceeds 930° C., the austenite grain size may be excessively coarsened to deteriorate the bendability. For this reason, the range of the annealing heating temperature is from [Ac3 point+50° C.] to 930° C. When the time of holding at this annealing heating temperature is less than 30 seconds, austenite transformation does not proceed sufficiently, so that 5% or more of ferrite is present in the final structure. When it exceeds 1200 seconds, the heat treatment cost increases to seriously reduce the productivity. Therefore, the annealing holding time is from 30 seconds to 1200 seconds.

Rapid cooling at an average cooling rate of 15° C./s or more from the annealing heating temperature to a cooling stop temperature of 450 to 550° C.

In this cooling course, it is important to obtain untransformed austenite without transforming austenite produced during annealing into ferrite, bainite or martensite during cooling. When the cooling stop temperature is 450° C. or higher, martensite transformation can be suppressed. However, when the cooling stop temperature exceeds 550° C., the surface texture after galvanization deteriorates. For this reason, the cooling stop temperature is from 450 to 550° C. On the other hand, when the cooling rate is less than 15° C./s, ferrite transformation or bainite transformation proceeds during cooling. When ferrite is produced, the tensile strength is decreased, and moreover, since ferrite is low in the dislocation density and also small in the solute carbon amount, the excellent bake hardenability cannot be realized. Further, bainite produced in this cooling course may be high in the dislocation density and also large in the solute carbon amount. However, during the subsequent immersion in the galvanizing bath and alloying treatment, the dislocation density is decreased, and the solute carbon amount is also decreased. For this reason, also when bainite is produced, the excellent bake hardenability cannot be realized. The cooling rate is therefore 15° C./s or more. More preferably, the cooling rate is 30° C./s or more.

Immersion in a hot-dip galvanizing bath within 30 seconds from the time of the stop of cooling (holding time after the stop of cooling)

When held for a long time after the stop of cooling, bainite transformation proceeds excessively. Therefore, the excellent bake hardenability cannot be realized. For this reason, it is necessary to perform the immersion in a hot-dip galvanizing bath within 30 seconds from the time of the stop of cooling. More preferably, the holding time after the stop of cooling is within 15 seconds, and particularly preferably, the holding time after the stop of cooling is within 10 seconds.

Holding at an alloying treatment temperature of 480 to 525° C. for 10 to 60 seconds (alloying treatment time)

The alloying treatment is generally performed in a temperature range of 450 to 600° C. for a holding time of 60 seconds or less. By performing it particularly in a temperature range of 480 to 525° C., the production temperature of bainite transformation which occurs during the alloying treatment is decreased to make it possible to increase the dislocation density in bainite. Exceeding 525° C. causes a decrease in the dislocation density, because the temperature of bainite transformation which occurs during the alloying treatment is high, and the excellent bake hardenability cannot be realized. On the other hand, at a temperature of lower than 480° C., the diffusion rate is not sufficient to delay the bainite transformation, and bainite cannot be produced in an amount necessary for securing the ductility. Therefore, the alloying treatment temperature is from 480 to 525° C. Further, when the alloying treatment time is too short, the bainite transformation is not sufficient, and bainite cannot be produced in an amount necessary for securing the ductility. On the other hand, when it is too long, the bainite transformation proceeds excessively to decrease the tensile strength. Therefore, the alloying treatment time is from 10 to 60 seconds.

Cooling at an average cooling rate of 15° C./s or more from the alloying treatment temperature to 200° C.

When the cooling rate from the alloying treatment temperature to 200° C. is too low, the martensite fraction is deceased, and a tensile strength of 1180 MPa or more cannot be satisfied. Further, a carbide is precipitated during cooling to decrease the solute C amount. Therefore, the average cooling rate from the alloying treatment temperature to 200° C. is 15° C./s or more.

The present invention is described below in greater detail by referring to Examples, but the present invention is of course not limited by the following Examples and can be of course implemented by appropriately making modifications therein as long as they are in conformity with the gist described above and later, and all of these modifications are included in the technical scope of the present invention.

EXAMPLES

[Test Method]

Steel having each of component compositions A to L shown in Table 1 was smelted, and an ingot having a thickness of 120 mm was produced. This ingot was used and hot-rolled to a thickness of 2.8 mm. This was pickled and then cold-rolled to a thickness of 1.4 mm to prepare a test material. Then, the test material was subjected to heat treatment and galvanization under the conditions shown in Table 2.

TABLE 1

| Steel Species | Chemical Components (mass %) | | | | | | | | |
|---|---|---|---|---|---|---|---|---|---|
| | C | Si | Mn | P | S | N | Al | Cu | Ni |
| A | 0.130 | 0.90 | 1.80 | 0.010 | 0.001 | 0.004 | 0.045 | — | — |
| B | 0.030* | 0.90 | 1.80 | 0.010 | 0.001 | 0.004 | 0.045 | — | — |
| C | 0.130 | 0.10* | 1.80 | 0.010 | 0.001 | 0.004 | 0.045 | — | — |
| D | 0.130 | 0.90 | 0.20* | 0.010 | 0.001 | 0.004 | 0.045 | — | — |
| E | 0.130 | 0.90 | 2.00 | 0.010 | 0.001 | 0.004 | 0.045 | 0.500 | — |
| F | 0.130 | 0.90 | 2.00 | 0.010 | 0.001 | 0.004 | 0.045 | — | 0.500 |
| G | 0.130 | 0.90 | 2.00 | 0.010 | 0.001 | 0.004 | 0.045 | — | — |
| H | 0.130 | 0.90 | 2.00 | 0.010 | 0.001 | 0.004 | 0.045 | — | — |
| I | 0.130 | 0.90 | 2.00 | 0.010 | 0.001 | 0.004 | 0.045 | — | — |
| J | 0.130 | 0.90 | 2.00 | 0.010 | 0.001 | 0.004 | 0.045 | — | — |
| K | 0.130 | 0.90 | 2.00 | 0.010 | 0.001 | 0.004 | 0.045 | — | — |
| L | 0.130 | 0.90 | 2.00 | 0.010 | 0.001 | 0.004 | 0.045 | — | — |

TABLE 1-continued

| Steel Species | Chemical Components (mass %) | | | | | | | | Ac3 (° C.) |
|---|---|---|---|---|---|---|---|---|---|
| | B | Mo | Cr | Nb | Ti | V | Ca | Mg | |
| A | — | — | — | — | — | — | — | — | 848 |
| B | — | — | — | — | — | — | — | — | 886 |
| C | — | — | — | — | — | — | — | — | 810 |
| D | — | — | — | — | — | — | — | — | 896 |
| E | — | — | — | — | — | — | — | — | 835 |
| F | — | — | — | — | — | — | — | — | 837 |
| G | 0.003 | — | — | — | 0.010 | — | — | — | 845 |
| H | — | — | 0.250 | — | — | — | 0.004 | 0.005 | 842 |
| I | 0.003 | 0.050 | 0.200 | — | 0.010 | — | — | — | 844 |
| J | 0.003 | — | — | 0.025 | 0.010 | — | — | — | 845 |
| K | 0.003 | — | — | — | 0.025 | — | — | — | 845 |
| L | 0.003 | — | — | — | 0.010 | 0.050 | 0.004 | 0.005 | 850 |

(*= Outside the scope of the present invention)

TABLE 2

| | | Heat Treatment Conditions | | | | | | | |
|---|---|---|---|---|---|---|---|---|---|
| Production No. | Steel Species | Annealing Heating Temperature (° C.) | Annealing Holding Time (s) | Average Cooling Rate after Annealing (° C./s) | Cooling Stop Temperature (° C.) | Holding Time after Stop of Cooling (s) | Alloying Treatment Temperature (° C.) | Alloying Treatment Time (s) | Average Cooling Rate after Alloying (° C./s) |
| 1 | A | 910 | 90 | 30 | 470 | 25 | 500 | 20 | 25 |
| 2 | A | 910 | 90 | 30 | 470 | 10 | 500 | 20 | 25 |
| 3** | A | 910 | 90 | 10** | 470 | 25 | 500 | 20 | 25 |
| 4** | A | 910 | 90 | 30 | 400** | 25 | 500 | 20 | 25 |
| 5** | A | 910 | 90 | 30 | 470 | 80** | 500 | 20 | 25 |
| 6** | A | 910 | 90 | 30 | 470 | 25 | 450** | 20 | 25 |
| 7** | A | 910 | 90 | 30 | 470 | 25 | 550** | 20 | 25 |
| 8** | A | 910 | 90 | 30 | 470 | 25 | 500 | 20 | 3** |
| 9 | B* | 910 | 90 | 30 | 470 | 10 | 500 | 20 | 25 |
| 10 | C* | 910 | 90 | 30 | 470 | 10 | 500 | 20 | 25 |
| 11 | D* | 910 | 90 | 30 | 470 | 25 | 500 | 20 | 25 |
| 12 | E | 910 | 90 | 30 | 470 | 10 | 500 | 20 | 25 |
| 13 | F | 910 | 90 | 30 | 470 | 25 | 500 | 20 | 25 |
| 14 | G | 910 | 90 | 30 | 470 | 25 | 500 | 20 | 25 |
| 15 | H | 910 | 90 | 30 | 470 | 25 | 500 | 20 | 25 |
| 16 | I | 910 | 90 | 30 | 470 | 25 | 500 | 20 | 25 |
| 17 | J | 910 | 90 | 30 | 470 | 10 | 500 | 20 | 25 |
| 18 | K | 910 | 90 | 30 | 470 | 10 | 500 | 20 | 25 |
| 19 | L | 910 | 90 | 30 | 470 | 10 | 500 | 20 | 25 |

(*= Outside the scope of the present invention, **= Outside the recommended scope)

[Measuring Methods]

By using each of the steel sheets obtained, the area percentage of each phases (martensite, bainite and ferrite) at a ¼ steel sheet thickness part, and the dislocation density and the solute carbon amount were measured. Further, in order to evaluate the mechanical properties of the steel sheet, the tensile strength (TS), the limiting bending radius (R) and the bake hardenability were also measured. Measuring methods thereof are shown below.

(Area Percentage of Each Phase)

The area percentage of each phase was determined by mirror-polishing each steel sheet, etching a surface thereof with a 3% nital solution to expose a metal structure, and thereafter observing the structure of the ¼ sheet thickness part at a magnification of 2,000 times for 5 visual fields of approximately 40 μm×30 μm regions by using a SEM (scanning electron microscope). Specifically, in a region observed in black, one containing thereinside a carbide observed in white was defined as bainite, one in which no carbide was observed was defined as ferrite, and a region appearing grey was defined as martensite. Although retained austenite may also be present as a hybrid structure with martensite, the retained austenite considered to be produced in the present invention is very small in amount, which is considered not to affect the properties. It is therefore not distinguished from martensite. Further, carbides may also be present inside the structure. However, assuming these carbides as a part of the structure containing them, the area percentages of martensite, bainite and ferrite was determined.

(Dislocation Density)

The dislocation density is calculated by irradiating a steel sheet to be a measurement object with X-rays and measuring the half value width of the diffraction peak obtained. Specifically, a specimen was prepared so as to be measurable at a position of ¼ depth in sheet thickness, and thereafter, this was applied to an X-ray diffractometer (manufactured by Rigaku Corporation, RAD-RU300) to collect an X-ray diffraction profile. Then, the dislocation density was calculated based on the X-ray diffraction profile according to the analysis method proposed by Nakajima et al. (see Nakajima et al., "Current Advances in Materials and Processes", Vol. 17 (2004), pp. 396-399).

(Solute Carbon Amount)

The solute carbon amount was determined from tetragonality (c-axis and a-axis ratio) as [% C]=(c/a−1)/0.045 (in which [% C]: solute C amount) by irradiating a steel sheet to be a measurement object with X-rays and determining the plane distance between (110) and (101) from the diffraction peak obtained. Specifically, a specimen was prepared so as to be measurable at a position of ¼ depth in sheet thickness, and thereafter, this was applied to an X-ray diffractometer (manufactured by Rigaku Corporation, RINT-RAPID II) to collect an X-ray diffraction profile. Then, the solute C amount was calculated by performing WPF (whole pattern fitting) analysis by using analysis software: JADE 2010 manufactured by MDI (USA).

(Tensile Strength)

A test piece of No. 5 described in JIS Z 2201 was produced by using each steel sheet as an evaluation object by arranging the major axis in the direction perpendicular to the rolling direction and subjected to measurement according to JIS Z 2241 to determine the tensile strength (TS).

(Limiting Bending Radius)

A test piece of 30 mm width×35 mm length was produced by using each steel sheet as an evaluation object by arranging the major axis in the direction perpendicular to the rolling direction and subjected to a bending test by the V-block method in conformity with JIS Z 2248. Then, the bending radius in the test was variously changed from 0 to 5 mm, whereby the minimum bending radius where the bending work can be performed without causing fracture of the material was determined, and this was defined as the limiting bending radius (R). In the present Examples, R/t was calculated from the obtained limiting bending radius (R) and the sheet thickness (t) of the steel sheet, and defined as an evaluation index of the bendability.

(Bake Hardenability)

A test piece of No. 5 described in JIS Z 2201 was produced by using each steel sheet as an evaluation object by arranging the major axis in the direction perpendicular to the rolling direction, and a pre-strain of 2% was applied thereto. Thereafter, heat treatment corresponding to a baking treatment at 170° C. for 20 minutes was applied thereto, and then, a tensile test was performed. The bake hardenability was determined by subtracting the stress when a pre-strain of 2% was applied from the yield stress in the tensile test after the above-described heat treatment. As the yield stress in the tensile test after the heat treatment, an upper yield point was employed, when a yield phenomenon appeared, and a 0.2% stress was employed, when it did not appeared.

[Measurement Results]

The measurement results are shown in Table 3 described below. In the present Examples, one having a tensile strength (TS) of 1180 MPa or more, a ratio R/t of the limiting bending radius (R) to the sheet thickness (t) of the steel sheet of 3.0 or less and a bake hardenability of 100 MPa or more was judged as passed and rated ○ and decided as a hot-dip galvanized steel sheet excellent in the strength, the bendability and the bake hardenability. On the other hand, one having a tensile strength (TS) of less than 1180 MPa, the R/t of more than 3.0 or a bake hardenability of less than 100 MPa was judged as failed and rated x. Each of the items shaded in Tables 1 to 3 indicates not satisfying the requirements of the present invention, the recommended production conditions, the mechanical properties, or the like.

TABLE 3

| Steel No. | Steel Species | Production No. | Area Percentage (%) Martensite | Bainite | Ferrite | Dislocation Density ($m^{-2}$) | Solute Carbon Amount (mass %) | TS (MPa) | R/t (—) | Bake Hardenability (MPa) | Judgment |
|---|---|---|---|---|---|---|---|---|---|---|---|
| 1 | A | 1 | 68 | 30 | 2 | $1.10 \times 10^{16}$ | 0.109 | 1221 | 2.5 | 134 | ○ |
| 2 | A | 2 | 80 | 19 | 1 | $1.23 \times 10^{16}$ | 0.126 | 1278 | 3.0 | 153 | ○ |
| 3 | A | 3** | 43* | 32 | 25* | $4.5 \times 10^{15*}$ | 0.069* | 1079* | 2.0 | 54* | X |
| 4 | A | 4** | 62 | 35 | 1 | $4.3 \times 10^{15*}$ | 0.082 | 1195 | 3.0 | 85* | X |
| 5 | A | 5** | 42* | 55 | 3 | $4.7 \times 10^{15*}$ | 0.061* | 1134* | 1.5 | 78* | X |
| 6 | A | 6** | 88* | 10 | 2 | $1.31 \times 10^{16}$ | 0.129 | 1311 | 4.0* | 178 | X |
| 7 | A | 7** | 56 | 41 | 3 | $3.9 \times 10^{15*}$ | 0.072* | 1188 | 2.5 | 81* | X |
| 8 | A | 8** | 41* | 57 | 2 | $8.4 \times 10^{15}$ | 0.043* | 1132* | 2.5 | 53* | X |
| 9 | B* | 9 | 13* | 23 | 64* | $8.7 \times 10^{14*}$ | 0.005* | 664* | 0.5 | 28* | X |
| 10 | C* | 10 | 75 | 22 | 3 | $1.02 \times 10^{16}$ | 0.063* | 1232 | 2.5 | 72* | X |
| 11 | D* | 11 | 15* | 27 | 58* | $9.8 \times 10^{14*}$ | 0.023* | 765* | 0.5 | 42* | X |
| 12 | E | 12 | 82 | 18 | 0 | $1.28 \times 10^{16}$ | 0.128 | 1298 | 3.0 | 167 | ○ |
| 13 | F | 13 | 74 | 25 | 1 | $1.15 \times 10^{16}$ | 0.112 | 1243 | 3.0 | 143 | ○ |
| 14 | G | 14 | 76 | 23 | 1 | $1.16 \times 10^{16}$ | 0.120 | 1252 | 2.5 | 151 | ○ |
| 15 | H | 15 | 70 | 28 | 2 | $1.12 \times 10^{16}$ | 0.105 | 1256 | 2.5 | 121 | ○ |
| 16 | I | 16 | 71 | 26 | 3 | $1.10 \times 10^{16}$ | 0.111 | 1264 | 2.5 | 138 | ○ |

TABLE 3-continued

| | | | Structure | | | | Mechanical Properties | | | |
|---|---|---|---|---|---|---|---|---|---|---|
| | | | Area Percentage (%) | | | Dislocation Density | Solute Carbon Amount | TS | R/t | Bake Hardenability | |
| Steel No. | Steel Species | Production No. | Martensite | Bainite | Ferrite | ($m^{-2}$) | (mass %) | (MPa) | (—) | (MPa) | Judgment |
| 17 | J | 17 | 81 | 17 | 2 | $1.24 \times 10^{16}$ | 0.126 | 1310 | 3.0 | 156 | ○ |
| 18 | K | 18 | 83 | 16 | 1 | $1.23 \times 10^{16}$ | 0.124 | 1301 | 3.0 | 143 | ○ |
| 19 | L | 19 | 82 | 15 | 3 | $1.20 \times 10^{16}$ | 0.125 | 1297 | 3.0 | 140 | ○ |

(*= Outside the scope of the present invention, **= Outside the recommended scope)

As shown in Table 3, all the invention steels (Steel Nos. 1, 2 and 12 to 19) satisfying the requirements (the above-described component requirements and the above-described structure requirements) of the present invention satisfy a tensile strength TS of 1180 MPa or more, an R/t of 3.0 or less and a bake hardenability of 100 MPa or more, and high-strength GA steel sheets having the strength, the bendability and the bake hardenability at the same time have been obtained.

On the other hand, the comparative steels (Steel Nos. 3 to 11) failing to satisfy at least one of the requirements (the above-described component requirements and the above-described structure requirements) of the present invention are inferior in at least any one property of the tensile strength TS, the bendability R/t and the bake hardenability.

For example, in Steel No. 3, the cooling rate after annealing is too low being out of the recommended range, as shown in Production No. 3 in Table 2, so that transformation proceeds during cooling. Therefore, ferrite is excessively increased, while martensite is insufficient, which causes decreases in the dislocation density and the solute carbon amount, and the tensile strength TS and the bake hardenability are thereby inferior, as shown in Table 3.

Further, in Steel No. 4, the cooling stop temperature after annealing is too low being out of the recommended range, as shown in Production No. 4 in Table 2, so that martensite transformation proceeds during cooling, and tempering is performed during the subsequent immersion in the galvanizing bath or during the alloying treatment. Therefore, the bake hardenability is decreased, and the bake hardenability is inferior, as shown in Table 3.

Furthermore, in Steel No. 5, the holding time after the stop of cooling is too long being out of the recommended range, as shown in Production No. 5 in Table 2, so that bainite transformation proceeds excessively during this time. Therefore, martensite is insufficient, while the dislocation density and the solute carbon amount are also insufficient, and the tensile strength TS and the bake hardenability are thereby inferior, as shown in Table 3.

In addition, in Steel No. 6, the alloying treatment temperature is too low being out of the recommended range, as shown in Production No. 6 in Table 2, so that bainite transformation is retarded to cause the lack of bainite. Therefore, martensite is excessively produced, and the bendability R/t is thereby inferior, as shown in Table 3.

On the other hand, in Steel No. 7, the alloying treatment temperature is too high being out of the recommended range, as shown in Production No. 7 in Table 2, so that the transformation temperature of bainite produced during the alloying treatment is high. Therefore, the dislocation density and the solute carbon amount are insufficient, and the bake hardenability is thereby inferior, as shown in Table 3.

Further, in Steel No. 8, the cooling rate after the alloying treatment is too low, as shown in Production No. 8 in Table 2. Therefore, martensite is insufficient and the solute carbon amount is insufficient, and the tensile strength TS and the bake hardenability are thereby inferior, as shown in Table 3.

Furthermore, in Steel No. 9, the C content is too low, as shown in Steel Species B in Table 1. Therefore, ferrite is excessively produced, while martensite is insufficient, the dislocation density and the solute carbon amount are insufficient, and the tensile strength TS and the bake hardenability are thereby inferior, as shown in Table 3.

In addition, in Steel No. 10, the Si content is too low, as shown in Steel Species C in Table 1. Therefore, the solute carbon amount is insufficient, and the bake hardenability is inferior, as shown in Table 3.

Moreover, in Steel No. 11, the Mn content is too low, as shown in Steel Species D in Table 1. Therefore, ferrite is excessively produced, while martensite is insufficient, the dislocation density and the solute carbon amount are insufficient, and the bake hardenability is thereby inferior, as shown in Table 3.

As described above, it has been confirmed that by satisfying the requirements of the present invention, the high-strength GA steel sheets having the strength, the bendability and the bake hardenability at the same time can be obtained.

While the present invention has been described in detail and with reference to specific embodiments thereof, it will be apparent to one skilled in the art that various changes and modifications can be made therein without departing from the spirit and scope of the present invention.

The present application is based on Japanese Patent Application (Patent Application No. 2014-043818) filed on Mar. 6, 2014, and the entire contents thereof are incorporated herein by reference.

The invention claimed is:

1. A high-strength hot-dip galvannealed steel sheet excellent in bake hardenability and bendability, having a component composition comprising, in mass %:
   C: from 0.05 to 0.30%,
   Si: from 0.5 to 3.0%,
   Mn: from 0.2 to 3.0%,
   P: from 0 to 0.10%,
   S: from 0 to 0.010%,
   N: from 0 to 0.010%,
   Al: from 0.001 to 0.10%, and
   iron and unavoidable impurities, and
having a steel structure comprising, in terms of area percentage:
   martensite: from 50 to 85% and
   ferrite: 0% or more and less than 5%, and
   bainite, and having:
a dislocation density of $5.0 \times 10^{15}$ m$^{-2}$ or more,
a solute carbon amount of 0.08 mass % or more, and
a tensile strength of 1180 MPa or more.

2. The high-strength hot-dip galvannealed steel sheet excellent in bake hardenability and bendability according to claim 1, wherein the component composition further comprises, in mass %, one or two of:
Cu: from 0.05 to 1.0%,
Ni: from 0.05 to 1.0%, and
B: from 0.0002 to 0.0050%.

3. The high-strength hot-dip galvannealed steel sheet excellent in bake hardenability and bendability according to claim 1, wherein the component composition further comprises, in mass %, one or two of:
Mo: from 0.01 to 1.0%,
Cr: from 0.01 to 1.0%,
Nb: from 0.01 to 0.3%,
Ti: from 0.01 to 0.3%, and
V: from 0.01 to 0.3%.

4. The high-strength hot-dip galvannealed steel sheet excellent in bake hardenability and bendability according to claim 2, wherein the component composition further comprises, in mass %, one or two of:
Mo: from 0.01 to 1.0%,
Cr: from 0.01 to 1.0%,
Nb: from 0.01 to 0.3%,
Ti: from 0.01 to 0.3%, and
V: from 0.01 to 0.3%.

5. The high-strength hot-dip galvannealed steel sheet excellent in bake hardenability and bendability according to claim 1, wherein the component composition further comprises, in mass %, one or two of:
Ca: from 0.0005 to 0.01% and
Mg: from 0.0005 to 0.01%.

6. The high-strength hot-dip galvannealed steel sheet excellent in bake hardenability and bendability according to claim 2, wherein the component composition further comprises, in mass %, one or two of:
Ca: from 0.0005 to 0.01% and
Mg: from 0.0005 to 0.01%.

7. The high-strength hot-dip galvannealed steel sheet excellent in bake hardenability and bendability according to claim 3, wherein the component composition further comprises, in mass %, one or two of:
Ca: from 0.0005 to 0.01% and
Mg: from 0.0005 to 0.01%.

8. The high-strength hot-dip galvannealed steel sheet excellent in bake hardenability and bendability according to claim 4, wherein the component composition further comprises, in mass %, one or two of:
Ca: from 0.0005 to 0.01% and
Mg: from 0.0005 to 0.01%.

9. The high-strength hot-dip galvannealed steel sheet excellent in bake hardenability and bendability according to claim 1, having a steel structure comprising, in terms of area percentage: ferrite: 0% or more and less than 2%.

10. The high-strength hot-dip galvannealed steel sheet excellent in bake hardenability and bendability according to claim 1, having a steel structure comprising, in terms of area percentage: martensite: from 60 to 80%.

11. The high-strength hot-dip galvannealed steel sheet excellent in bake hardenability and bendability according to claim 1, having a steel structure comprising, in terms of area percentage: a dislocation density of $7.0 \times 10^{15}$ m$^{-2}$ or more.

12. The high-strength hot-dip galvannealed steel sheet excellent in bake hardenability and bendability according to claim 1, having a steel structure comprising, in terms of area percentage: a solute carbon amount of 0.1 mass % or more.

* * * * *